US008367739B2

(12) United States Patent
Zaki et al.

(10) Patent No.: US 8,367,739 B2
(45) Date of Patent: Feb. 5, 2013

(54) ASPHALT RELEASE AGENT

(75) Inventors: Nael Naguib Zaki, Peoria, AZ (US);
Robert Ernest Troxler, Raleigh, NC (US)

(73) Assignee: Troxler Electronic Laboratories, Inc., Research Triangle Park, NC (US)

( * ) Notice: Subject to any disclaimer, the term of this patent is extended or adjusted under 35 U.S.C. 154(b) by 1143 days.

(21) Appl. No.: 11/025,878

(22) Filed: Dec. 29, 2004

(65) Prior Publication Data

US 2006/0141270 A1    Jun. 29, 2006

(51) Int. Cl.
*C09K 3/18* (2006.01)
*B01D 1/02* (2006.01)
*B01F 17/54* (2006.01)
*B01F 17/42* (2006.01)
*B28B 7/38* (2006.01)
*B32B 15/04* (2006.01)

(52) U.S. Cl. .......... 516/55; 427/299; 427/331; 427/335; 427/387; 427/416; 427/421.1; 427/427.4; 427/154; 427/155; 427/156; 106/2; 106/38.24; 106/38.27; 106/162.1; 264/338; 156/289; 510/366

(58) Field of Classification Search .......... 516/55; 428/447; 427/299, 331, 355, 387, 416, 421.1, 427/427.4, 154, 155, 156; 106/1, 38.24, 106/38.7, 162.1; 156/289; 264/338; 510/366
See application file for complete search history.

(56) References Cited

U.S. PATENT DOCUMENTS

| | | | |
|---|---|---|---|
| 3,359,212 A * | 12/1967 | Bailey | 516/55 |
| 3,427,271 A * | 2/1969 | McKellar | 106/287.13 |
| 4,078,104 A | 3/1978 | Martin | |
| 4,389,322 A | 6/1983 | Horodysky | |
| 4,496,473 A | 1/1985 | Sanderson | |
| H444 H * | 3/1988 | Roth et al. | 264/45.1 |
| 4,954,554 A | 9/1990 | Bunge | |
| 4,956,115 A | 9/1990 | Van de Mark | |
| 5,066,756 A | 11/1991 | Raleigh et al. | |
| 5,108,782 A | 4/1992 | Reed | |
| 5,143,639 A | 9/1992 | Krawack | |
| 5,145,977 A * | 9/1992 | Petroff et al. | 556/437 |
| 5,186,979 A | 2/1993 | Ballenger, Jr. et al. | |
| 5,194,173 A | 3/1993 | Folkard et al. | |
| 5,254,661 A * | 10/1993 | Wilson | 428/57 |
| 5,322,554 A | 6/1994 | DeLong | |
| 5,407,490 A | 4/1995 | Zofchak | |
| 5,413,729 A | 5/1995 | Gaul | |
| 5,421,907 A | 6/1995 | Nieendick et al. | |
| 5,443,760 A * | 8/1995 | Kasprzak | 424/78.03 |
| 5,468,502 A | 11/1995 | Argiriadi et al. | |
| 5,472,631 A | 12/1995 | Harris | |
| 5,482,645 A | 1/1996 | Maruyama et al. | |
| 5,494,502 A * | 2/1996 | DeLong | 106/2 |
| 5,585,341 A | 12/1996 | Van Eenam | |
| 5,720,825 A | 2/1998 | Kinnaird | |
| 5,888,279 A | 3/1999 | Salmonsen et al. | |
| 5,900,048 A | 5/1999 | Olson et al. | |
| 5,961,730 A | 10/1999 | Salmonsen et al. | |
| 6,010,995 A | 1/2000 | Van Eenam | |
| 6,013,323 A * | 1/2000 | Klayder et al. | 427/384 |
| 6,017,862 A | 1/2000 | Doyel et al. | |
| 6,030,466 A | 2/2000 | Myers | |
| 6,126,757 A | 10/2000 | Kinnaird | |
| 6,143,812 A | 11/2000 | Martin et al. | |
| 6,156,833 A * | 12/2000 | Rauls | 516/67 |
| 6,281,189 B1 | 8/2001 | Heimann et al. | |
| 6,284,720 B1 | 9/2001 | Opre | |
| 6,372,201 B1 | 4/2002 | Leuridan et al. | |
| 6,395,103 B1 | 5/2002 | Machac et al. | |
| 6,410,677 B1 | 6/2002 | Enoki et al. | |
| 6,420,443 B1 * | 7/2002 | Clark et al. | 521/114 |
| 6,423,303 B1 * | 7/2002 | Ryklin et al. | 424/60 |
| 6,451,731 B1 * | 9/2002 | Agbaje et al. | 504/118 |
| 6,486,249 B1 * | 11/2002 | Dituro et al. | 524/388 |
| 6,503,413 B2 * | 1/2003 | Uchiyama et al. | 252/8.61 |
| 6,506,444 B1 * | 1/2003 | Mahr et al. | 427/138 |
| 6,544,942 B1 | 4/2003 | Smith et al. | |
| 6,579,908 B1 * | 6/2003 | Penny et al. | 516/31 |
| 6,589,595 B2 | 7/2003 | Kinnaird | |
| 6,593,279 B2 | 7/2003 | Von Krosigk | |
| 6,623,554 B2 | 9/2003 | Kinnaird | |
| 6,838,426 B1 | 1/2005 | Zeilinger | |
| 6,984,269 B2 | 1/2006 | Motson | |
| 7,381,249 B2 * | 6/2008 | Hasinovic et al. | 106/10 |
| 7,547,672 B2 | 6/2009 | Zaki | |
| 2001/0056166 A1* | 12/2001 | Mohri et al. | 528/9 |
| 2002/0150676 A1 | 10/2002 | Kinnaird | |
| 2003/0037829 A1 | 2/2003 | Wilson | |
| 2003/0051395 A1 | 3/2003 | Cox et al. | |
| 2003/0080200 A1 | 5/2003 | Rosa | |
| 2003/0083220 A1 | 5/2003 | Doyel et al. | |
| 2003/0123747 A1 | 7/2003 | Yang et al. | |
| 2003/0125223 A1 | 7/2003 | Denton | |

(Continued)

FOREIGN PATENT DOCUMENTS

| EP | 0 498 545 | 8/1992 |
|---|---|---|
| EP | 1 723 224 | 10/2010 |

(Continued)

OTHER PUBLICATIONS

Sylgard 309 MSDS online @ http://files.tlhort.com/msds_labels/3583-sylgard_309_-_msds.pdf, (revision date Mar. 3, 2005), Dow Corning, Midland, MI, (down loaded Dec. 8, 2008).*

(Continued)

*Primary Examiner* — Daniel S Metzmaier
(74) *Attorney, Agent, or Firm* — Jenkins, Wilson, Taylor & Hunt, P.A.

(57) ABSTRACT

A composition for promoting the release of bituminous materials and other adhesive materials from a substrate and methods of use thereof. More particularly, a composition comprising a silicone oil-in-water emulsion, which is stabilized by an alkoxylated polysiloxane surfactant, for use as a release agent that can be applied to a substrate, such as a truck bed, prior to use for promoting the free release of a bituminous material, such as asphalt, from the substrate.

80 Claims, No Drawings

U.S. PATENT DOCUMENTS

| | | | |
|---|---|---|---|
| 2003/0148029 | A1 | 8/2003 | Rosa |
| 2003/0148905 | A1 | 8/2003 | Motson |
| 2003/0213747 | A1 | 11/2003 | Carbonell et al. |
| 2004/0110850 | A1* | 6/2004 | Jordan et al. ............ 516/55 |
| 2005/0197267 | A1 | 9/2005 | Zaki et al. |
| 2006/0079423 | A1 | 4/2006 | Zaki |
| 2007/0243132 | A1 | 10/2007 | Russell-Jones et al. |
| 2009/0305896 | A1 | 12/2009 | Sun et al. |

FOREIGN PATENT DOCUMENTS

| | | |
|---|---|---|
| WO | WO92/20835 | 11/1992 |
| WO | WO98/32833 | 7/1998 |
| WO | WO00/77135 | 12/2000 |
| WO | WO01/90291 | 11/2001 |
| WO | WO03/072215 | 9/2003 |
| WO | WO2005/091771 | 10/2005 |
| WO | WO2006/042316 | 4/2006 |
| WO | WO2006/071401 | 7/2006 |

OTHER PUBLICATIONS

Sylgard 309 product information online @ http://www3.dowcorning.com/DataFiles/090007c8800037ba.pdf , (Copyright date 2001—month unavailable), Dow Corning, Midland, MI (downloaded Dec. 8, 2008).*

Lewis, Richard J., Sr. (2002). Hawley's Condensed Chemical Dictionary (14th Edition), John Wiley & Sons, Online version available at: http://knovel.com/web/portal/browse/display?_EXT_KNOVEL_DISPLAY_bookid=704&VerticalID=0 , headwords=bactericide, biocide, sodium benzoate (downloaded Jun. 8, 2010).*

International Search Report and Notification of Transmittal dated Sep. 12, 2006.

International Preliminary Report on Patentability dated Jul. 12, 2007.

Aleksandrovic et al., "Poly(ether-ester) modified with different amounts of fumaric moieties," Polymer. vol. 43 pp. 3199-3208 (2002).

"Amphoteric polymers for the use in cleaning compositions," Research Disclosure. No. 483103 pp. 1003-1004 (2004).

Bancroft, "The Theory of Emulsification, V,"Journal of Physical Chemistry. vol. 17 pp. 501-519 (1913).

Brown et al., NCAT Report No. 91-7, "Evaluation of Pavement Bleeding Problem on 1-55 in Illinois", Meeting of the Transportation Research Board, pp. 1-18 (1991).

Decision to Grant Patent corresponding to European Patent Application No. 05 712 312.7-1221/1723224 dated Sep. 23, 2010.

Hawley's Condensed Chemical Dictionary, 12$^{th}$ Ed. (Richard J. Lewis, Sr. Ed.) (1993) at 101.

Hodge, H.C., and Sterner, J. H., Combined Tabulation of Toxicity Classes, in Handbook of Toxicology (Spector, W.S., Ed., W.B. Saunders Co., Philadelphia and London), vol. 1 (1956).

Hodge, H.C., and Sterner, J. H., "Tabulation of Toxicity Classes," Am. Indus. Hyg. A. Quart., vol. 10 pp. 93-96 (1949).

Intent to Grant Communication under Rule 71(3) EPC corresponding to European Application No. 05 712 312.7-1221 dated Apr. 29, 2010.

International Search Report corresponding to International Application No. PCT/US2005/036908 dated Feb. 3, 2006.

Interview Summary corresponding to U.S. Appl. No. 10/791,427 dated Nov. 2, 2009.

Kilpatrick, P.K., and Spiecker, P.M., "Asphaltene Emulsions," Encyclopedic Handbook of Emulsion Technology. New York-Basel. pp. 707-730 (2000).

Kulkarni et al., "Development of a Procedure to Determine the Effectiveness of Asphalt-Removing Solvents," Journal of Testing and Evaluation. vol. 31, No. 5 pp. 429-437 (2003).

Marin Municipal Water District Vegetation Management Plan, Chapter 8, Draft Sep. 2, 2008 online @ http://www.marinwater.org/documents/Chap8_SurfDye9_2_08.pdf. 8-1-8-17, (Sep. 2, 2008).

Notice of Allowance corresponding to Canadian Patent Application No. 2,551,855 dated Dec. 15, 2009.

Notice of Allowance corresponding to U.S. Appl. No. 11/248,782 dated Feb. 12, 2009.

Notification of Transmittal of the International Preliminary Report on Patentability (Chapter II of the Patent Cooperation Treaty) corresponding to International Patent Application No. PCT/US2005/002823 dated Nov. 15, 2006.

Notification of Transmittal of International Preliminary Report on Patentability (Chapter II of the Patent Cooperation Treaty) corresponding to International Patent Application No. PCT/US2005/042082 dated May 6, 2008.

Notification of Transmittal of the International Search Report and the Written Opinion of the International Searching Authority, or the Declaration corresponding to International Patent Application No. PCT/US2005/002823 dated Jul. 11, 2006.

Official Action corresponding to Canadian Patent Application No. 2,551,855 dated Jul. 10, 2008.

Official Action corresponding to Canadian Patent Application No. 2,551,855 dated Apr. 15, 2009.

Official Action corresponding to Canadian Patent Application No. 2,551,855 dated Jul. 21, 2010.

Official Action corresponding to European Patent Application No. 05 712 312.7-1221 dated Jul. 28, 2008.

Official Action corresponding to European Patent Application No. 05 712 312.7-1221 dated Jun. 22, 2009.

Official Action corresponding to U.S. Appl. No. 10/791,427 dated Feb. 24, 2006.

Official Action corresponding to U.S. Appl. No. 10/791,427 dated Jun. 1, 2006.

Official Action corresponding to U.S. Appl. No. 10/791,427 dated Mar. 9, 2007.

Official Action corresponding to U.S. Appl. No. 10/791,427 dated Jun. 23, 2008.

Official Action corresponding to U.S. Appl. No. 10/791,427 dated Apr. 29, 2009.

Official Action corresponding to U.S. Appl. No. 10/791,427 dated Jul. 28, 2010.

Official Action corresponding to U.S. Appl. No. 11/248,782 dated Jul. 23, 2008.

Sun, Jinxia; Dissertation "Characterization of Organosilicone Surfactants and Their Effects on Sulfonylurea Herbicide Activity", Apr. 5, 1996 online @ http://scholar.lib.vt.edu/theses/available/etd-214813359611541/unrestricted/jsun.pdf.

Supplementary European Search Report corresponding to European Patent Application No. 05 712 312.7-1221 dated Jan. 25, 2008.

Written Opinion of the International Searching Authority corresponding to International Patent Application No. PCT/US2005/042082 dated Sep. 12, 2006.

Extended European Search Report corresponding to European Patent Application No. 05851914.1-2115/1841545 dated Mar. 2, 2012.

Stark, J.D., and Walthall, W.K., "Agricultural Adjuvants: Acute Mortality and Effects on Population Growth Rate of *Daphnia pulex* After Chronic Exposure," Environmental Toxicology and Chemistry. vol. 22, No. 12 pp. 3056-3061 (2003).

* cited by examiner

ASPHALT RELEASE AGENT

TECHNICAL FIELD

The presently disclosed subject matter relates to a composition for promoting the release of bituminous materials and other adhesive materials from a substrate and methods of use thereof. More particularly, the presently disclosed subject matter relates to a composition comprising a silicone oil-in-water emulsion, which is stabilized by an alkoxylated polysiloxane surfactant, for use as a release agent that can be applied to a substrate, such as a truck bed, prior to use for promoting the free release of a bituminous material, such as an asphalt, from the substrate.

BACKGROUND

Bituminous materials, such as bituminous binders, asphalt, coal tar pitches, and petroleum residue, whether of natural or synthetic origin, are used in many construction and industrial applications, such as roofing, waterproofing, and, in particular, the paving of roadways, parking lots, and the like. In paving applications, a hot asphalt mix typically is produced at an asphalt processing plant and is transported to the construction site in a vehicle, e.g., a truck, such as a dump truck, equipped with a metal bed or other container, such as a trailer. Once the asphalt is transported to the construction site, the asphalt is discharged from the truck bed or trailer and is applied to existing asphalt pavement or a rock or concrete base using paving equipment, such as an asphalt spreader and a pressure roller, coupled with the use of manual workpieces, such as shovels, rakes, and other tools.

The same properties that give bituminous binders and asphalt their desirable characteristics, for example, toughness and outstanding adhesion to a variety of substrates, can present significant problems in the course of their use in paving and other applications. For example, the asphalt can adhere to the metal surfaces, such as the truck beds, paving equipment, and workpieces, with which it comes into contact. Such problems have been exacerbated by the recent introduction of new types of asphalt compositions that are modified with organic polymeric materials, such as synthetic or natural rubbers, thermoplastic elastomers, and thermoplastic resins, which tend to form more tenacious bonds with a variety of materials and substrates.

The adhesion and buildup of bituminous materials on paving equipment has long been problematic. The tendency of asphalt to adhere to the metal surface of the truck bed, for example, prevents the asphalt from smoothly sliding out of the bed as the truck attempts to discharge its load. In such circumstances, workers must manually coax the residual asphalt out of the truck bed, exposing workers to hot asphalt that can contain hazardous petroleum-based chemicals. Solidified pieces of asphalt often adhere to the bed despite the workers' best efforts. Thus, asphalt is wasted and material usage suffers. Also, as the hardened deposits of asphalt build up on the surface of the truck bed, the deposits can eventually break off as large solid inclusions in subsequent road mixes, thereby degrading the quality of the applied product. Further, adhesion of residual asphalt to the paving equipment and workpieces often renders the paving equipment and workpieces unsuitable for their intended purposes and causes cleanup and maintenance problems.

Thus, in an effort to circumvent the aforementioned problems which occur during the transport and handling of hot-mix asphalt, it has been necessary to treat the surfaces of the truck bed, paving equipment, and workpieces with a suitable release agent to prevent the asphalt mix from adhering to the metal surfaces thereof. In the past, petroleum oils, such as diesel fuel (or a similar type of petroleum-based fuel), have been used to coat the walls of the truck beds or trailers to facilitate asphalt release. The use of diesel fuel-based release agents, however, has largely fallen into disfavor for several reasons. First, the indiscriminate use of diesel fuel as a release agent can contaminate the soil and ground water, leading to heightened environmental concerns. Accordingly, the U.S. Department of Transportation and many state highway departments have restricted the use of diesel fuel as a release agent. Second, the use of diesel fuel presents a health risk to workers exposed to the diesel fuel during application. Third, diesel fuel is flammable and thus poses a safety risk when used in the proximity of hot asphalt production or paving equipment. Fourth, the release capabilities of diesel fuel decrease over time, for example, during lengthy trips from the asphalt source to the paving project. Finally, diesel fuel-based release agents often act as a solvent to dilute or "cut" the asphalt, thereby degrading the structural integrity of the applied asphalt product. For example, diesel fuel has a tendency to migrate to the surface of the pavement, which results in the formation of soft spots in the pavement. Further, diesel-fuel based release agents are not always effective in promoting the release of polymer-modified asphalt compositions from metal substrates.

Other asphalt release agents known in the art often contain components, such as vegetable oils and animal fats, which also tend to dissolve, and thereby soften, the asphalt material. Although vegetable oils and animal fats are less damaging to the asphalt in this regard than diesel fuel-based release agents, they can still strip bituminous binders from the hot-mix asphalt at the elevated temperatures commonly observed in paving applications and thereby compromise the integrity of the applied product. Most of these release agents also suffer from other undesirable characteristics, such as being environmentally hazardous, thermally unstable, corrosive, prohibitively expensive, and/or of limited effectiveness. Also, the delivery, preparation, and application of these release agents often can be complex. Further, these release agents often require frequent applications to promote satisfactory release of the asphalt from the substrate.

Another approach to solving this problem has been to use water-soluble compositions as asphalt release agents. The use of water-based compositions is attractive because, as opposed to volatile organic solvents, water is environmentally benign and relatively inexpensive. One drawback to this approach, however, is that, due to the low viscosity of water and many aqueous solutions, the film rapidly drains off of the substrate, thereby leaving the substrate unprotected. Thus, the aqueous film does not adhere to the substrate for a sufficient amount of time to prevent adhesion of the asphalt to the substrate.

A further desired characteristic for commercially acceptable asphalt release agents is that they must be suitable for use shortly after application to a substrate. Accordingly, compositions that provide effective release only after extended drying periods are not suitable for use as asphalt release compositions in paving applications. The requirement of extended drying periods is another potential drawback to the use of water-based compositions due to the much slower evaporation of water as compared to volatile organic solvents. Further, the formation of stable aqueous emulsions of suitable release agents, such as polysiloxanes, can be difficult to achieve.

Therefore, there is a long-felt need for an improved asphalt release agent, in particular a water-based composition, which is effective in promoting the release of bituminous materials, such as asphalt, from a substrate; is environmentally safe, non-toxic, and biodegradable; does not degrade or compromise the integrity of the asphalt product; adheres sufficiently to the substrate to which it is applied; and provides for multiple releases of the bituminous material from the substrate.

Other desirable characteristics in an asphalt release agent would include: the capability to be applied without the use of volatile organic solvents and/or specialized equipment; the ability to inhibit the corrosion of the surfaces to which is applied; thermally stability, so it will not decompose and/or volatilize when contacted with the hot asphalt mix; the ability to inhibit the growth of living organisms during storage; and a sufficiently high flash point to avoid flammability hazards which might be encountered at the asphalt source or paving site. Moreover, the release agent should be easy to prepare, deliver and apply even in cold weather conditions. Also, because of the large surface areas to be coated and the frequency of the required coatings, the release agent composition should be relatively inexpensive to produce and apply.

Further, the release composition should be effective for use with different types of bituminous materials, including but not limited to, hot bitumens, bituminous binders, bitumen sheets, coal tar pitches, special-purpose coal tar pitches and formulations comprising special-purpose coal tar pitches, and, various types of asphalts, such as silent (rubberized) asphalts, polymer-modified asphalts, water-permeable asphalts, abrasion resistant asphalts, colored asphalts, and high-viscosity asphalts.

Accordingly, the presently disclosed subject matter was discovered to fill the need for an improved release composition and methods of use thereof for promoting the release of bituminous materials and other adhesive materials from a substrate.

SUMMARY

Disclosed herein is a composition for promoting the release of bituminous materials from a substrate. In some embodiments, the composition comprises a silicone oil-in-water emulsion, which is stabilized by an alkoxylated polysiloxane surfactant. In some embodiments, the silicone oil component of the emulsion comprises a substituted polysiloxane. In some embodiments, the substituted polysiloxane comprises a polydialkylsiloxane. In some embodiments, the substituted polysiloxane comprises a polydiarylsiloxane. In some embodiments, the polydialkylsiloxane comprises a polydimethylsiloxane.

In some embodiments, the structure of the alkoxylated polysiloxane surfactant can be represented as follows:

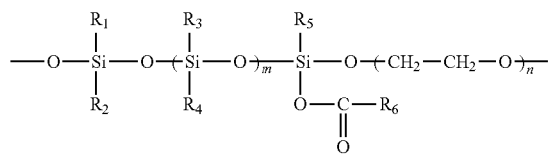

wherein $R_1$, $R_2$, $R_3$, $R_4$, $R_5$, and $R_6$ are each independently selected from the group consisting of straight-chain alkyl, branched alkyl, substituted alkyl, aryl, and substituted aryl; n is an integer ranging from 1 to 100; and m is an integer ranging from 5 to 200. In some embodiments, $R_1$, $R_2$, $R_3$, $R_4$, $R_5$, and $R_6$ are each independently a lower alkyl group, i.e., a $C_1$ to $C_8$ alkyl group. In some embodiments, $R_1$, $R_2$, $R_3$, $R_4$, and $R_5$ are each a methyl group and $R_6$ is an ethyl group.

In some embodiments, the concentration of the silicone oil ranges from about 1% by weight to about 45% by weight; the concentration of the alkoxylated polysiloxane surfactant ranges from about 1% by weight to about 45% by weight; and the amount of water ranges from about 10% by weight to about 98% by weight. In some embodiments, the concentration of the silicone oil ranges from about 1% by weight to about 40% by weight; the concentration of the alkoxylated polysiloxane surfactant ranges from about 1% by weight to about 20% by weight; and the amount of water ranges from about 40% by weight to about 90% by weight. In some embodiments, the weight ratio of the silicone oil to the polysiloxane surfactant is about 1:1. Accordingly, in some embodiments, the composition comprises about 5% by weight silicone oil, about 5% by weight alkoxylated polysiloxane surfactant, and about 90% by weight water.

In some embodiments, the composition comprises an additive. In some embodiments, the additive comprises a corrosion inhibitor, such as an amine and/or an imidazoline-based inhibitor. In some embodiments, the additive comprises an anti-freeze agent, such as ethylene glycol, to prevent the composition from freezing at very low temperatures.

In some embodiments, a biodegradable polymer, such as alginic acid, poly sodium alginate, polylactic acid, and carboxymethylcellulose, is added to the composition as a viscofier to increase adhesion of the emulsion to the substrate.

In some embodiments, the amine or imidazoline corrosion inhibitor is added at a concentration ranging from about 0 ppm to about 500 ppm; the anti-freeze agent, e.g., ethylene glycol, is added at a concentration ranging from about 0% by weight to about 10% by weight; and the viscofier, e.g., a biodegradable polymer, is added at a concentration ranging from about 0% by weight to about 10% by weight. In some embodiments, the amine or imidazoline corrosion inhibitor is added at a concentration ranging from about 0 ppm to about 100 ppm; the anti-freeze agent, e.g., ethylene glycol, is added at a concentration ranging from about 0% by weight to about 5% by weight; and the viscofier, e.g., a biodegradable polymer, is added at a concentration ranging from about 0% by weight to about 5% by weight.

It is also desirable to prevent organisms from growing in the release composition during storage. Accordingly, in some embodiments, the release composition comprises a biocide. It is also desirable to adjust the pH of the release composition. Accordingly, in some embodiments, the release composition comprises a pH-adjusting chemical, such as a base.

The presently disclosed subject matter describes a method for promoting the release of an organic material from a substrate, the method comprising:
  (a) providing a substrate;
  (b) applying a release composition to the substrate before contacting the substrate with the organic material, wherein the release composition comprises:
    (i) a silicone oil component; and
    (ii) an alkoxylated polysiloxane surfactant; and
  (c) contacting the substrate with the organic material.

The presently disclosed subject matter describes a method for releasing asphalt from a substrate, the method comprising:
  (a) applying the release composition as described herein to a substrate to form a coated substrate;
  (b) contacting the coated substrate with hot asphalt; and
  (c) removing the asphalt from the substrate.

The presently disclosed subject matter describes a nonstick coating composition comprising a silicone oil component and an alkoxylated polysiloxane.

The presently disclosed subject matter describes a method for suppressing a release of dust from a work site, such as a road construction site, the method comprising:
(a) providing the release composition as described herein;
(b) diluting the release composition in water to form a diluted release composition; and
(c) applying the diluted release composition to a surface at a work site.

The presently disclosed subject matter discloses a method of applying an asphalt release composition to a measuring surface of an asphalt quality control instrument, the method comprising:
(a) providing an asphalt release composition;
(b) providing a measuring surface of an asphalt quality control instrument; and
(c) applying the asphalt release composition to the measuring surface of the asphalt quality control instrument.

In some embodiments, the asphalt release composition comprises a silicone oil component and an alkoxylated polysiloxane surfactant.

A release composition described by the presently disclosed subject matter exhibits one or more of several desirable properties, including but not limited to, the observation that it is: (1) stable, i.e., will not separate over an extended period of time; (2) non-corrosive; (3) non-toxic; (4) non-flammable, i.e., does not flash in the closed cup flashpoint tester; (5) inert, i.e., does not strip the binder (bitumen) from the asphalt, which is a desired characteristic to prevent deterioration of the hot-mix asphalt by the release agent; (6) water soluble, i.e., can be diluted with water at any proportion; (7) easily applied using spray bottles and other application devices known in the art; (8) environmentally benign, i.e., does not contain any organic solvents or volatile organic compounds (VOCs) that pose a hazard to the environment; and (9) does not affect the maximum theoretical density (MTD) as measured by the Rice test method (AASHTO T209 or ASTM D2041). Further, in some embodiments, compositions of the presently described subject matter allow asphalt to slide free, e.g., be released, from a substrate at room temperature.

Accordingly, the presently disclosed subject matter provides a composition for promoting the release of a bituminous material or other adhesive materials from a substrate and methods of use thereof. This and other aspects are addressed in whole or in part by the presently disclosed subject matter. Other aspects will become evident as the description proceeds, when taken in connection with the accompanying Examples as best described herein below.

DETAILED DESCRIPTION

The presently disclosed subject matter now will be described more fully hereinafter with reference to the accompanying Examples, in which representative embodiments are shown. The presently disclosed subject matter can, however, be embodied in many different forms and should not be construed as limited to the embodiments set forth herein. Rather, these embodiments are provided so that this disclosure will be thorough and complete, and will fully convey the scope of the presently disclosed subject matter to those skilled in the art.

I. Novel Compositions

Disclosed herein is a composition for promoting the release of a bituminous material from a substrate, the composition comprising a silicone oil component and an alkoxylated polysiloxane surfactant.

In some embodiments, the silicone oil component comprises a substituted polysiloxane. In some embodiments, the substituted polysiloxane comprises a polydialkylsiloxane. In some embodiments, the substituted polysiloxane comprises a polydiarylsiloxane. In some embodiments, the polydialkylsiloxane comprises a polydimethylsiloxane.

In some embodiments, the alkoxylated polysiloxane surfactant comprises a compound of the following formula:

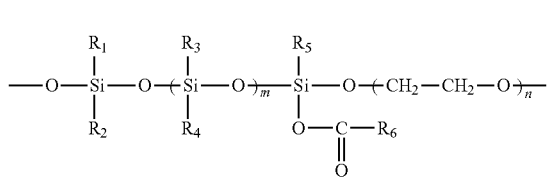

wherein $R_1$, $R_2$, $R_3$, $R_4$, $R_5$, and $R_6$ are each independently selected from the group consisting of straight-chain alkyl, branched alkyl, substituted alkyl, aryl, and substituted aryl; n is an integer ranging from 1 to 100; and m is an integer ranging from 5 to 200. In some embodiments, $R_1$, $R_2$, $R_3$, $R_4$, $R_5$ and $R_6$ are each independently a lower alkyl group, e.g., a $C_1$ to $C_8$ alkyl group. In some embodiments, $R_1$, $R_2$, $R_3$, $R_4$, and $R_5$ are each a methyl group and $R_6$ is an ethyl group.

In some embodiments, the composition comprises:
(a) from about 1% by weight to about 45% by weight of a silicone oil component;
(b) from about 1% by weight to about 45% by weight of a surfactant, wherein the surfactant comprises an alkoxylated polysiloxane surfactant; and
(c) from about 10% by weight to about 98% by weight water.

In some embodiments, the composition comprises about 5% by weight of the silicone oil component, about 5% by weight of the alkoxylated polysiloxane surfactant; and about 90% by weight water.

In some embodiments, the composition comprises a corrosion inhibitor. In some embodiments, the corrosion inhibitor is selected from one of an amine and an imidazoline-based inhibitor. In some embodiments, the composition comprises from about 0 to about 500 ppm of a corrosion inhibitor.

In some embodiments, the composition comprises an anti-freeze agent. In some embodiments, the anti-freeze agent comprises an ethylene glycol. In some embodiments, the composition comprises from about 0% by weight to about 10% by weight of an anti-freeze agent.

In some embodiments, the composition comprises a viscofier. In some embodiments, the viscofier comprises a biodegradable polymer. In some embodiments, the biodegradable polymer is selected from the group consisting of alginic acid, poly sodium alginate, polylactic acid, and carboxymethylcellulose. In some embodiments, the composition comprises from about 0% by weight to about 10% by weight of a viscofier.

Accordingly, in some embodiments, the composition comprises:
(a) from about 0 to about 500 ppm of a corrosion inhibitor;
(b) from about 0% by weight to about 10% by weight of an anti-freeze agent; and
(c) from about 0% by weight to about 10% by weight of a viscofier.

It is also desirable to prevent organisms from growing in the release composition during storage. Accordingly, in some embodiments, the release composition comprises a biocide. In some embodiments, the biocide comprises a bactericide. In some embodiments, the bactericide comprises sodium benzoate. It is also desirable that the biocide is environmentally benign.

It is also desirable to adjust the pH of the release composition. Accordingly, in some embodiments, the release composition comprises a pH-adjusting chemical. In some embodiments, the pH-adjusting chemical comprises a base. In some embodiments, the base is selected from the group consisting of an alkali hydroxide, such as sodium hydroxide, ammonia, sodium carbonate, sodium bicarbonate, and an amine, including, but not limited to aniline, piperidine, pyridine, alkylamines, dialkylamines, and trialkylamines, such as trimethylamine, triethylamine, and diisopropylethylamine. It is also desirable for the base to be a mild, environmentally friendly base.

In some embodiments, the composition is non-toxic. In some embodiments, the composition is biodegradable. In some embodiments, the composition is non-corrosive. In some embodiments, the composition is non-flammable.

In some embodiments, the composition is essentially free of volatile organic solvents. As used herein, the term "essentially free of volatile organic solvents" is construed to mean that the composition does not contain trace amounts of volatile organic compounds (VOCs) above the detection limits as defined in EPA method 8260B, Office of Solid Waste, United States Environmental Protection Agency, incorporated herein by reference in its entirety.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such stereoisomers and racemic mixtures exist.

While the following terms are believed to be well understood by one of ordinary skill in the art, the following definitions are set forth to facilitate explanation of the presently described subject matter.

As used herein, the term "siloxane" refers to a compound comprising branched or unbranched chains of alternating silicon and oxygen atoms, wherein each silicon atom is separated from its nearest silicon neighbor by a single oxygen atom. The term "siloxane" as referred to herein further comprises the term "polysiloxane." An example of a polysiloxane can be represented by the following formula:

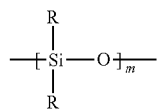

wherein R is a straight-chain alkyl group, a branched alkyl group, a substituted alkyl group, an aryl group, or a substituted aryl group as defined herein below, and m is an integer ranging from 5 to 200. An example of a polysiloxane compound is polydimethylsiloxane, wherein R is a methyl group.

As used herein the term "silicone oil" refers to a polymeric siloxane or a mixture of polymeric siloxanes as defined hereinabove. An exemplary silicone oil consists essentially of polydimethylsiloxane.

As used herein the term "alkyl" refers to $C_{1-20}$ inclusive, e.g., an alkyl group of 1, 2, 3, 4, 5, 6, 7, 8, 9, 10, 11, 12, 13, 14, 15, 16, 17, 18, 19 or 20 carbons, linear (i.e., "straight-chain"), branched, or cyclic, saturated or unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl, propyl, or butyl group, is attached to a linear alkyl chain. "Lower alkyl" refers to an alkyl group having 1 to about 8 carbon atoms, e.g., an alkyl group of 1, 2, 3, 4, 5, 6, 7 or 8 carbons (i.e., a $C_{1-8}$ alkyl). "Higher alkyl" refers to an alkyl group having about 10 to about 20 carbon atoms, e.g., alkyl groups of 10, 11, 12, 13, 14, 15, 16, 17, 18, 19 or 20 carbons. In some embodiments, "alkyl" refers, in particular, to $C_{1-8}$ straight-chain alkyls, e.g., straight-chain alkyls of 1, 2, 3, 4, 5, 6, 7 or 8 carbons. In other embodiments, alkyl refers, in particular, to $C_{1-8}$ branched-chain alkyls, e.g., branched-chain alkyls of 1, 2, 3, 4, 5, 6, 7 or 8 carbons. The term "alkylated" refers to a chemical compound containing one or more alkyl groups.

Alkyl groups can optionally be substituted with one or more alkyl group substituents, which can be the same or different. The term "alkyl group substituent" includes but is not limited to alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. There can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

The term "aliphatic" refers to an organic compound wherein the carbon and hydrogen atoms are arranged in saturated or unsaturated straight or branched chains, including alkanes, alkenes and alkynes, wherein representative alkanes, alkenes, and alkynes are provided in and are encompassed by the definition of the term "alkyl" hereinabove.

The term "aryl" is used herein to refer to an aromatic substituent that can be a single aromatic ring, or multiple aromatic rings that are fused together, linked covalently, or linked to a common group such as a methylene or ethylene moiety. The common linking group also can be a carbonyl as in benzophenone or oxygen as in diphenylether or nitrogen as in diphenylamine. The term "aryl" specifically encompasses heterocyclic aromatic compounds. The aromatic ring(s) can comprise phenyl, naphthyl, biphenyl, diphenylether, diphenylamine and benzophenone, among others. In particular embodiments, the term "aryl" means a cyclic aromatic comprising about 5 to about 10 carbon atoms, e.g., 5, 6, 7, 8, 9, or 10 carbon atoms, and including 5- and 6-membered hydrocarbon and heterocyclic aromatic rings.

The aryl group can be optionally substituted with one or more aryl group substituents which can be the same or different, where "aryl group substituent" includes alkyl, aryl, aralkyl, hydroxyl, alkoxyl, aryloxyl, aralkyloxyl, carboxyl, acyl, halo, nitro, alkoxycarbonyl, aryloxycarbonyl, aralkoxycarbonyl, acyloxyl, acylamino, aroylamino, carbamoyl, alkylcarbamoyl, dialkylcarbamoyl, arylthio, alkylthio, alkylene, and —NR'R", where R' and R" can be each independently hydrogen, alkyl, aryl, and aralkyl.

Specific examples of aryl groups include but are not limited to cyclopentadienyl, phenyl, furan, thiophene, pyrrole, pyran, pyridine, imidazole, benzimidazole, isothiazole, isoxazole, pyrazole, pyrazine, triazine, pyrimidine, quinoline, isoquinoline, indole, carbazole, and the like.

The term "aromatic" refers to an organic compound containing one or more unsaturated carbon rings characteristic of the benzene series and related organic groups.

The term "alkoxylated" refers to a chemical compound containing one or more alkoxyl groups as defined herein. The term "alkoxyl" refers to an alkyl-group, wherein alkyl is as previously described. The term "alkoxyl" as used herein can refer to $C_{1-20}$ inclusive, e.g., a hydrocarbon chain of 1, 2, 3, 4, 5, 6, 7, 8, 9, 10, 11, 12, 13, 14, 15, 16, 17, 18, 19 or 20 carbons, linear, branched, or cyclic, saturated or unsaturated oxo-hydrocarbon chains, including, for example, methoxy, ethoxy, propoxy, isopropoxy, butoxy, t-butoxy, and pentoxy. In some embodiments, the alkoxylated polysiloxane is an ethoxylated polysiloxane.

The term "acetate" refers to a salt or an ester of acetic acid containing the radical group —C(=O)OR, wherein R is a branched or unbranched alkyl group.

The term "ester" refers to an organic compound of the general formula:

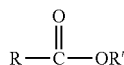

wherein R and R' are the same or different alkyl or aryl groups. The term "aliphatic ester" refers to an ester wherein "R" and/or "R'" is an alkyl group as defined herein. The term "aromatic ester" refers to an ester wherein "R" and/or "R'" is an aryl group as defined herein.

The term "water-soluble" refers to a substance capable of dissolving in water to form an isotropic solution.

The term "surfactant" refers to a substance capable of reducing the surface tension of a liquid in which it is dissolved. More particularly, surfactants are chemicals that contain hydrophobic and hydrophilic groups in the same molecule. The balance between the hydrophilic part of a surfactant and its hydrophilic part is often termed the hydrophilic-lipophilic balance (HLB). The HLB controls the solubility of the surfactant in water or oil, and its ability to stabilize emulsions. In general, according to Bancroft's Rule, see Bancroft, W. D., *Journal of Physical Chemistry*, 17, 507 (1913), water-soluble surfactants stabilize oil-in-water emulsions, and oil-soluble surfactants stabilize water-in-oil emulsions. The surfactants incorporated in the presently disclosed subject matter are water soluble, i.e., they stabilize oil-in-water emulsions, are inherently biodegradable and non-toxic, and pose no safety or fire hazards.

The term "viscofier" refers to a substance that when added to a liquid or semi-solid material increases the viscosity thereof.

The term "non-toxic" refers to the relative toxicity of a substance as measured by the $LD_{50}$ (lethal dose 50 percent kill). For example, the oral $LD_{50}$ in rats of the individual components in representative embodiments of the release composition described herein are: polydimethylsiloxane (>24,000 mg/kg); ethylene glycol (4,700 mg/kg); imidazoline (1,932 mg/kg); alginic acid (1,600 mg/kg); poly sodium alginate (>5,000 mg/kg); polylactic acid (3,730 mg/kg); and carboxymethylcellulose (27,000 mg/kg).

The relative toxicity of substances can be compared by use of the Hodge and Sterner scale. See Hodge, H. C. and Sterner, J. H., *Am Indus. Hyg. A. Quart.* 10, 93-96 (1949); Hodge, H. C. and Sterner, J. H., Combined Tabulation of Toxicity Classes, in *Handbook of Toxicology* (Spector, W. S., Ed., W. B. Saunders Co., Philadelphia), Vol. 1 (1956). For example, under the Hodge and Sterner scale, substances with an oral $LD_{50}$ in rats of 15,000 mg/kg or more are assigned a toxicity rating of 6 and are considered "relatively harmless;" substances with an oral $LD_{50}$ in rats of 5,000 to 15,000 are assigned a toxicity rating of 5 are considered "practically non-toxic;" and substances with an oral $LD_{50}$ in rats of 500 to 5,000 are assigned a toxicity rating of 4 and are considered "slightly toxic."

The term "biodegradable" refers to a substance that can be chemically degraded via natural effectors, such as bacteria, weather, plants or animals. Although there is no single definition of biodegradability, throughout the United States and internationally there is a wide range of environmentally preferable definitions. For example, the ASTM standards committee has defined biodegradability in terms of the degree of degradation, time, and test methodology. Despite these definitions, there are two widely used designations for biodegradability: readily and inherently. Readily biodegradable is defined as degrading 80 percent within 21 days as measured by the decrease of a test sample. This type of degradation is preferable because, in most cases, the substance will degrade long before environmental damage has occurred. Thus, readily biodegradable materials require little in terms of long-term bio-remediation. Inherent biodegradability is defined as having the propensity to biodegrade, with no indication of timing or degree. Further, relative biodegradability can be determined by use of the UK Offshore Chemical Notification Scheme (OCNS) rating scale. Under the OCNS rating scale, category E is the least toxic category, whereas category A is the most toxic. Any rating from category C to E typically signifies that the material can be readily biodegradable and can be nonbioaccumulative. See, e.g., Offshore Chemical Notification Scheme, Centre for Environment, Fisheries and Aquaculture Science (CEFAS), United Kingdom Department for Environment, Food and Rural Affairs, for a description of chemical ratings.

The term "non-flammable" refers to a substance that is not readily ignited. In this respect, the U.S. DOT Hazardous Materials regulations define flammable liquids as having a flash point of less than 141° F. (60.55° C.). See U.S. Department of Transportation Hazardous Materials Regulations, 49 C.F.R. Part 173.120. Another closely related definition is found in the U.S. EPA Hazardous Waste regulations. See U.S. Environmental Protection Agency Regulations, 40 C.F.R. Part 261.21. The EPA regulations define an ignitable liquid as having a flash point less than 140° F. (60° C.). Both sets of regulations require the flash point to be determined by a closed-cup ASTM D-93 method.

The term "biocide" refers to a chemical agent that is capable of destroying living organisms or inhibiting their growth. Likewise, the term "bactericide" refers to a chemical agent that is capable of destroying bacteria or inhibiting their growth. A representative bactericide is sodium benzoate.

As used herein, the term "about," when referring to a value or to an amount of mass, weight, time, volume, concentration or percentage is meant to encompass variations of ±20% or ±10%, in another example ±5%, in another example ±1%, in another example ±0.5%, and in still another example ±0.1% from the specified amount, as such variations are appropriate to perform the disclosed method or to employ the disclosed composition.

II. Novel Methods

In some embodiments of the presently disclosed subject matter, a method of promoting the release of an organic material, such as a bituminous material and/or another adhesive material, from a substrate is provided, the method comprising
(a) providing a substrate;
(b) applying a release composition to the substrate, wherein the release composition comprises a silicone oil component and an alkoxylated polysiloxane surfactant;
(c) contacting the substrate with the organic material.

In some embodiments, the silicone oil component comprises a disubstituted polysiloxane. In some embodiments, the disubstituted polysiloxane comprises a polydialkylsiloxane. In some embodiments, the disubstituted polysiloxane comprises a polydiarylsiloxane. In some embodiments, the polydialkylsiloxane comprises a polydimethylsiloxane.

In some embodiments, the alkoxylated polydialkylsiloxane surfactant comprises a compound of the following formula:

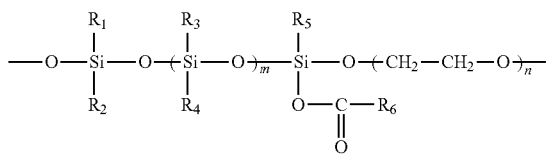

wherein $R_1$, $R_2$, $R_3$, $R_4$, $R_5$, and $R_6$ are each independently selected from the group consisting of straight-chain alkyl, branched alkyl, substituted alkyl, aryl and substituted aryl; n is an integer ranging from 1 to 100; and m is an integer ranging from 5 to 200. In some embodiments, $R_1$, $R_2$, $R_3$, $R_4$, $R_5$, and $R_6$ are each independently a lower alkyl group, i.e., a $C_1$ to $C_8$ alkyl group. In some embodiments, $R_1$, $R_2$, $R_3$, $R_4$, and $R_5$ are each a methyl group and $R_6$ is an ethyl group.

In some method embodiments, the release composition comprises:
(a) from about 1% by weight to about 45% by weight of a polysiloxane component;
(b) from about 1% by weight to about 45% by weight of a surfactant, wherein the surfactant comprises an alkoxylated polysiloxane surfactant; and
(c) from about 10% by weight to about 98% by weight water.

In some embodiments, the release composition comprises about 5% by weight of the silicone oil component, about 5% by weight of the alkoxylated polysiloxane surfactant; and about 90% by weight water.

In some embodiments, the release composition comprises a corrosion inhibitor. In some embodiments, the corrosion inhibitor is selected from one of an amine and an imidazoline-based inhibitor. In some embodiments, the release composition comprises from about 0 to about 500 ppm of a corrosion inhibitor.

In some embodiments, the release composition comprises an anti-freeze agent. In some embodiments, the anti-freeze agent comprises an ethylene glycol. In some embodiments, the release composition comprises from about 0% by weight to about 10% by weight of an anti-freeze agent.

In some embodiments, the release composition comprises a viscofier. In some embodiments, the viscofier comprises a biodegradable polymer. In some embodiments, the biodegradable polymer is selected from the group consisting of alginic acid, poly sodium alginate, polylactic acid, and carboxymethylcellulose. In some embodiments, the release composition comprises from about 0% by weight to about 10% by weight of a viscofier.

Accordingly, in some embodiments, the release composition comprises:
(a) from about 0 to about 500 ppm of a corrosion inhibitor;
(b) from about 0% by weight to about 10% by weight of an anti-freeze agent; and
(c) from about 0% by weight to about 10% by weight of a viscofier.

In some embodiments, the release composition is non-toxic. In some embodiments, the release composition is biodegradable. In some embodiments, the release composition is non-corrosive. In some embodiments, the release composition is non-flammable. In some embodiments, the release composition is essentially free of volatile organic solvents.

In some embodiments, the release composition comprises a biocide. In some embodiments, the biocide comprises a bactericide. In some embodiments, the bactericide comprises sodium benzoate.

In some embodiments, the release composition comprises a pH-adjusting chemical. In some embodiments, the pH-adjusting chemical comprises a base. In some embodiments, the base is selected from the group consisting of an alkali hydroxide, ammonia, sodium carbonate, sodium bicarbonate, and an amine, including, but not limited to aniline, piperidine, pyridine, alkylamines, dialkylamines, and trialkylamines, such as trimethylamine, triethylamine, and diisopropylethylamine.

In some embodiments, the organic material comprises a bituminous material. In some embodiments, the bituminous material is selected from the group consisting of a bituminous binder, an asphalt, a resin, a coal tar pitch, a tar, and an automotive undercoating material. In some embodiments, the bituminous material comprises an asphalt. In some embodiments, the asphalt comprises a polymer-modified asphalt.

In some embodiments, the organic material is a rubber material, such as a molded rubber or a tire. In some embodiments, the organic material is a plastic material, including a molded plastic material.

In some embodiments, the organic material comprises an adhesive material. In some embodiments, the adhesive material comprises a paint. In some embodiments, the paint comprises an automotive paint. In some embodiments, the adhesive material comprises masking tape.

In some embodiments, the substrate comprises a metal substrate. In some embodiments, the metal substrate is on an article used for transporting a bituminous material. In some embodiments, the article used for transporting the bituminous material comprises a truck bed, such as a dump truck bed.

In some embodiments, the metal substrate is on an article used for applying a bituminous material to a second substrate. In some embodiments, the second substrate is selected from one of an existing pavement and a road base. In some embodiments, the article used for applying the bituminous material comprises a piece of paving equipment. In some embodiments, the piece of paving equipment comprises an asphalt spreader. In some embodiments, the piece of paving equipment comprises a pressure roller.

In some embodiments, the second substrate comprises a building material. In some embodiments, the building material comprises a roofing material.

In some embodiments, the metal substrate is on an article used for handling a bituminous material. In some embodiments, the article used for handling the bituminous material comprises a workpiece. In some embodiments, the workpiece comprises a shovel. In some embodiments, the workpiece comprises a rake.

In some embodiments, the metal substrate is selected from the group consisting of a mold, a die, and a cutting blade. In some embodiments, the metal substrate is selected from the group consisting of a storage drum, a storage tank, a transport trailer, piping, a roller, and an undercarriage of a vehicle.

In some embodiments, the substrate comprises a non-metal substrate. In some embodiments, the non-metal substrate is selected from the group consisting of a plastic substrate, a rubber substrate, a ceramic substrate, and combinations thereof. In some embodiments, the non-metal substrate comprises a conducting material. In some embodiments, the non-metal substrate comprises a non-conducting material. In some embodiments, the non-metal substrate is selected from the group consisting of a tire, a roller, and a conveyer belt.

In some embodiments, the non-metal substrate comprises a component of an asphalt quality control instrument, including a nuclear density gauge, such as Model 3450 ROAD-READER™ PLUS (Troxler Electronic Laboratories, Inc., Research Triangle Park, N.C., United States of America) and a non-nuclear electromagnetic gauge, such as Model 2701 PAVETRACKER™ (Troxler Electronic Laboratories, Inc., Research Triangle Park, N.C., United States of America). Such gauges can be used for measuring the density of asphalt, soil, aggregate, and concrete and the moisture content of soil, aggregate, and roofing material. The adhesion of asphalt to the measuring surface of an asphalt quality control instrument causes erroneous measurements. Such instruments can have a measuring surface comprising a metal, a plastic material, a ceramic material, a conducting material, a non-conducting material, and combinations thereof. Accordingly, the presently disclosed release composition can be applied to the measuring surface of such instruments to prevent asphalt from adhering thereon.

Thus, in some embodiments, the asphalt quality control instrument comprises a gauge. In some embodiments, the component of the asphalt quality control instrument comprises a measuring surface of the gauge. In some embodiments, the measuring surface of the gauge comprises a probe.

In some embodiments, the applying of the release composition to the substrate comprises a spraying process. Accordingly, the applying of the release composition to a substrate comprises:

(a) delivering the release composition to a spray nozzle;
(b) flowing the release composition through a spray nozzle; and
(c) spraying the release composition onto the substrate.

In some embodiments, the silicone oil component and the alkoxylated polysiloxane surfactant are mixed to form a release composition concentrate prior to the delivering of the release composition to the spray nozzle. Further, in some embodiments, a predetermined amount of water is added to the release composition concentrate prior to the delivering of the release composition to the spray nozzle. The predetermined amount of water added to the release composition concentrate prior to the delivering of the release composition to the spray nozzle can be an amount of water sufficient to allow the release composition to be sprayed onto the substrate. In some embodiments, the predetermined amount of water added to the concentrate comprises an amount of water sufficient to provide a release composition that comprises about 90% water.

In some embodiments, the applying of the release composition to a substrate comprises delivering the silicone oil component and the alkoxylated polysiloxane surfactant to the spray nozzle separately. Thus, in some embodiments, the silicone oil component and the alkoxylated polysiloxane surfactant are mixed in the spray nozzle, for example in an atomizer contained within the spray nozzle. In some embodiments, a predetermined amount of water is delivered to the spray nozzle simultaneously with the delivering of the silicone oil component and the alkoxylated polysiloxane surfactant. Thus, in some embodiments, the silicone oil component, the alkoxylated polysiloxane surfactant, and the water are mixed in the spray nozzle, for example in an atomizer contained within the spray nozzle. The predetermined amount of water delivered to the spray nozzle simultaneously with the delivering of the silicone oil component and the alkoxylated polysiloxane surfactant can be an amount of water sufficient to allow the release composition to be sprayed onto the substrate. In some embodiments, the predetermined amount of water delivered to the spray nozzle comprises an amount of water sufficient to provide a release composition that comprises about 90% water.

In some embodiments, the applying of the release agent to the substrate comprises a coating process.

In some embodiments, the contacting of the substrate with the bituminous material is performed more than one time without repeating the step of applying the release composition to the substrate. In some embodiments, the contacting of the substrate with the bituminous material is performed two times without the step of applying the release composition to the substrate. In some embodiments, the contacting of the substrate with the bituminous material is performed three or more times without repeating the step of applying the release composition to the substrate.

In some embodiments, the presently disclosed subject matter describes a nonstick coating composition, wherein the nonstick coating composition comprises a silicone oil component and an alkoxylated polysiloxane.

In some embodiments of the nonstick coating composition, the silicone oil component comprises a substituted polysiloxane, wherein the substituted polysiloxane is selected from one of a polydialkylsiloxane and a polydiarylsiloxane. In some embodiments, the polydialkylsiloxane comprises a polydimethylsiloxane.

In some embodiments of the nonstick coating composition, the alkoxylated polysiloxane surfactant comprises a compound of the following formula:

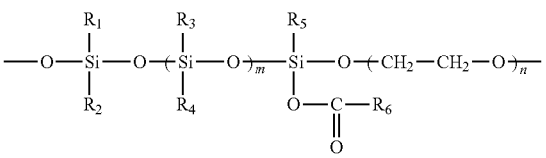

wherein $R_1$, $R_2$, $R_3$, $R_4$, $R_5$, and $R_6$ are each independently selected from the group consisting of straight-chain alkyl, branched alkyl, substituted alkyl, aryl and substituted aryl; n is an integer ranging from 1 to 100; and m is an integer ranging from 5 to 200. In some embodiments, $R_1$, $R_2$, $R_3$, $R_4$, $R_5$, and $R_6$ are each independently lower alkyl. In some embodiments, $R_1$, $R_2$, $R_3$, $R_4$, and $R_5$ are each a methyl group and $R_6$ is an ethyl group.

In some embodiments, the nonstick coating composition comprises:

(a) from about 1% by weight to about 45% by weight of the silicone oil component;
(b) from about 1% by weight to about 45% by weight of the alkoxylated polysiloxane surfactant; and
(c) from about 10% by weight to about 98% by weight water.

In some embodiments, the composition comprises:
  (a) about 5% by weight of the silicone oil component;
  (b) about 5% by weight of the alkoxylated polysiloxane surfactant; and
  (c) about 90% by weight water.

In some embodiments, the presently disclosed subject matter discloses a method for releasing asphalt from a substrate, the method comprising:
  (a) applying release composition as described herein to a substrate to form a coated substrate;
  (b) contacting the coated substrate with hot asphalt; and
  (c) removing the asphalt from the substrate.

In some embodiments, the presently disclosed subject matter describes a method for suppressing a release of dust from a work site, the method comprising:
  (a) providing a release composition as described herein;
  (b) diluting the release composition in water to form a diluted release composition; and
  (c) applying the diluted release composition to a surface at a work site.

In some embodiments, the method further comprises diluting the release composition in water by one of (a) adding water to a concentrate of the release composition to form a diluted release composition before it is applied to the surface at a work site and (b) mixing water with the release composition as it is applied to the surface at a work site. In some embodiments, the work site is selected from the group consisting of a road construction site, coal crushing operation, a limestone crushing operation, and a concrete milling operation.

In some embodiments, the presently disclosed subject matter discloses a method of applying an asphalt release composition to a measuring surface of an asphalt quality control instrument, the method comprising:
  (a) providing an asphalt release composition;
  (b) providing a measuring surface of an asphalt quality control instrument; and
  (c) applying the asphalt release composition to the measuring surface of the asphalt quality control instrument.

In some embodiments, the asphalt release composition comprises a silicone oil component and an alkoxylated polysiloxane surfactant.

In some embodiments, the silicone oil component comprises a substituted polysiloxane, wherein the substituted polysiloxane is selected from one of a polydialkylsiloxane and a polydiarylsiloxane. In some embodiments, the polydialkylsiloxane comprises a polydimethylsiloxane. In some embodiments, the alkoxylated polysiloxane surfactant comprises a compound of the following formula:

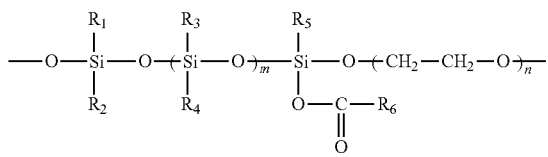

wherein $R_1$, $R_2$, $R_3$, $R_4$, $R_5$, and $R_6$ are each independently selected from the group consisting of straight-chain alkyl, branched alkyl, substituted alkyl, aryl and substituted aryl; n is an integer ranging from 1 to 100; and m is an integer ranging from 5 to 200. In some embodiments, $R_1$, $R_2$, $R_3$, $R_4$, $R_5$, and $R_6$ are each independently lower alkyl. In some embodiments, $R_1$, $R_2$, $R_3$, $R_4$, and $R_5$ are each a methyl group and $R_6$ is an ethyl group.

In some embodiments, the asphalt quality control instrument comprises a nuclear density gauge, such as Model 3450 ROADREADER™PLUS (Troxler Electronic Laboratories, Inc., Research Triangle Park, N.C., United States of America). In some embodiments, the asphalt quality control instrument comprises a non-nuclear electromagnetic gauge, such as Model 2701 PAVETRACKER™ (Troxler Electronic Laboratories, Inc., Research Triangle Park, N.C., United States of America). Such gauges can be used for measuring the density of asphalt, soil, aggregate, and concrete and the moisture content of soil, aggregate, and roofing material. The adhesion of asphalt to the measuring surface of an asphalt quality control instrument causes erroneous measurements. Such instruments can have a measuring surface comprising a metal, a plastic material, a ceramic material, a conducting material, a non-conducting material, and combinations thereof. Accordingly, the presently disclosed release composition can be applied to the measuring surface of such instruments to prevent asphalt from adhering thereon.

As used herein, the term "substrate" is to be construed broadly and refers to various solid materials, which can come into or are in contact with the bituminous material. Inorganic and organic substrates, as well as alloys and composites thereof, are well within the scope of the presently described subject matter. The term "inorganic substrate" is to be construed broadly and refers to substrates comprising various metallic and ceramic materials. Exemplary substrates can be present in and/or on transport containers, equipment, and workpieces used in paving applications.

The term "bituminous material," as understood in the art, is a material that contains "bitumen." Bitumen is the predominant constituent of petroleum residues, including asphalt. As known in the art, "bitumen" is defined as a mixture of hydrocarbons occurring in petroleum residue, and is a component of asphalt and tar that are used, for example, for surfacing roads. The term "bitumen" as used herein includes, but is not limited to, highway paving bitumens, industrial bitumens, bituminous binders, for example in the form of solutions and emulsions, polymer-modified bitumens and asphalts, natural asphalts, industrial asphalts, bitumen sheets, coal tar pitches, special-purpose coal tar pitches and formulations comprising special-purpose coal tar pitches such as highway pitches, coal tar binder pitches, coal tar impregnating pitches, prepared pitches, pitch suspensions and special-purpose coal tar pitches with minerals. Since at conventional temperatures, bitumens, bituminous binders and asphalts are fairly solid and relatively unaffected by water, they are used extensively to "asphalt" traffic areas, such as highways, lots and streets (in admixture with a large number of other materials) and roofs, and also to produce roofing felts.

Further, asphaltenes can be present as part of the bitumen. The term "asphaltene" is defined to include components of the high boiling point fraction of the crude oil, which are composed of polynuclear aromatic hydrocarbons of molecular weights ranging from about 500 to about 2000 daltons or greater and aggregate molecular weights of up to about 20,000 daltons joined by alkyl chains. See, e.g., Hawley's Condensed Chemical Dictionary, 12$^{th}$ Ed. (Richard J. Lewis, Sr., Ed.) (1993), at 101. Asphaltenes are understood by one of ordinary skill in the art to include the toluene-soluble fraction of crude oil that is insoluble in n-heptane or n-pentane. Other components, such as, for example, oils, waxes, resins, pitch, tar and tack, also can be present in the bituminous material.

The term "asphalt," as understood by one of ordinary skill in the art, is a product of crude oil refining processing, giving rise to a cement-like material containing bitumen. In an exemplary process, crude oil is distilled in a primary flash distillation column, the residue of which is introduced to an atmospheric distillation column. The residue of the atmospheric distillation process is typically distilled under reduced pressure, e.g., vacuum distillation, and the residue is termed "asphalt." The asphalt produced from the vacuum distillation of crude oil typically has softening points ranging from about 25° C. to about 55° C. Asphalts of intermediate softening points can be made, for example, by blending with higher and lower softening point asphalts. If the asphalt has a low softening point, it can be hardened by further distillation with steam or by oxidation, e.g., air blowing. Furthermore, asphalt also can be produced by propane deasphalting during the production of lubricating oils from crude oil residua. The asphalt produced by propane deasphalting can have a softening point of about 90° C. Softer grades can be made by blending the hard asphalt with the extract obtained in the solvent treatment of lubricating oils.

Accordingly, "asphalt" generally can be defined as the residue of mixed-base and asphalt-base crude oils. Asphalt is difficult to distill even under the highest vacuum, because the temperatures used tend to promote formation of coke. Asphalts have complex chemical and physical compositions, which usually vary with the source of the crude oil. Asphalts generally comprise dispersions of particles, called asphaltenes as described hereinabove, in a high-boiling fluid comprising oil and resins. The nature of the asphalt is often determined by such factors as the nature of the medium, e.g., paraffinic or aromatic, as well as the nature and proportion of the asphaltenes and of the resins. The polar and fused ring portions of the asphaltenes have been suggested to be lyophobic, that is, they lack an affinity for the medium in which they are dispersed. In contrast, the resins are considered to be lyophilic, that is, they exhibit an affinity for the medium in which they are dispersed. The interaction of the resins with the asphaltenes is believed to be responsible for asphaltene solvation or dispersion, which appears to exercise marked control on the quality of the asphalt. The asphaltenes vary in character, but typically are of sufficiently high molecular weight or aggregate size to require solvation or dispersion by the resins.

For the purposes of the presently disclosed subject matter, the term "asphalt" includes crude asphalt, as well as, without limitation, the following finished products: cements, fluxes, the asphalt content of emulsions, and petroleum distillates blended with asphalts to make cutback asphalts. Cutbacks and emulsions compose liquid asphalts. A cutback can be defined as a cement that has been liquefied with solvents, such as, for example, naptha or gasoline or kerosene. Emulsified asphalts are mixtures of asphalt cement, water, and an emulsifying agent.

A typical paving asphalt mixture comprises a mixture of components, including an asphalt composition or cement and aggregate or aggregate material usually containing rock and/or gravel. In such mixtures, the ratio of asphalt composition to the aggregate material varies, for example, according to the aggregate material type and the nature of the asphalt composition. As used herein, the terms "asphalt composition" or "asphalt cement" are understood to refer to any of a variety of organic materials, solid or semi-solid at room temperature, which gradually liquefy when heated, and in which the predominant constituents are naturally occurring bitumens or residues commonly obtained in petroleum, synthetic petroleum, shale oil refining, or from coal tar, or the like. A "paving asphalt composition" or "paving asphalt cement," accordingly, is an asphalt composition or asphalt cement having characteristics which dispose the composition for use as a paving material, as contrasted, for example, with an asphalt composition suited for use as a roofing material. "Roofing asphalt," for example, usually has a higher softening point, and is thus more resistant to flow from heat on roofs. The higher softening point is generally imparted to the material by the air blowing processes used for producing the material. The presently disclosed release composition can be used with any type of asphalt composition or aggregate mix therewith, including, but not limited to, paving grade asphalt and roofing asphalt.

Paving asphalt mixtures can be formed and applied in a variety of ways. For example, the paving asphalt composition and the aggregate are typically mixed and applied at elevated temperatures at the fluid state of the paving asphalt composition to form the pavement or road surface. The asphalt composition also can be applied in alternating layers with the aggregate mix. The paving grade asphalt compositions can comprise any known bituminous or asphaltic substance obtained from natural sources and/or derived from petroleum, shale oil, coal tar, and the like, as well as mixtures of two or more of such materials. The paving asphalt compositions often are referred to as viscosity or penetration grade asphalt, having original penetrations up to 400 as measured by ASTM method D946-82. Exemplary asphalts include the normal paving asphalts, such as AC2.5, AC5, AC10, AC20, AC30, and AC40, wherein "AC" is defined as "asphalt cement" and the accompanying number indicates the viscosity at 60° C. in Poise multiplied by 100. Typical of such asphalts are the straight run asphalts derived from the atmospheric, steam and/or vacuum distillation of crude oils, or those asphalts derived from solvent precipitation treatments or raw lubricating oils and their fractions. Also included in these asphalts, are the thermal or "cracked" asphalts, which are separated as cracker bottom residues from refinery cracking operations and the asphalt produced as by-products in hydro-refining operations. Another such asphalt is the vacuum tower bottoms that are produced during the refining of synthetic or petroleum oils. The asphalt can be treated or modified before use.

The presently disclosed compositions and methods can be used for promoting the release of bituminous materials, such as asphalts, from a variety of substrates in a number of applications. Exemplary applications of the presently disclosed subject matter include, without limitation, coating the surfaces of transporting containers, equipment and workpieces used in: paving roads, highways, parking lots, and the like; waterproofing roads, highways, parking lots, and the like; dampproofing and waterproofing buildings and structures; and installing roofing materials.

III. Representative Applications

The presently disclosed compositions and methods can be used for promoting the release of organic materials from a substrate in a number of varied applications. Exemplary applications include, without limitation:

Agricultural applications, such as: cattle sprays, dampproofing and waterproofing buildings and structures, disinfectants, fence post coating, mulches, mulching paper, paved barn floors, barnyards, feed platforms, and the like, protecting tanks, vats, and the like, protection for concrete structures, tree paints, water and moisture barriers (above and below ground), wind and water erosion control, and weather modification areas.

Buildings and building applications, such as: floors, e.g., dampproofing and waterproofing buildings and structures, floor compositions, tiles and coverings, insulating fabrics, papers, step treads; roofing, e.g., building papers, built-up roof adhesives, felts, primes, caulking compounds, cement waterproofing compounds, cleats for roofing, glass wool compositions, insulating fabrics, felts, papers, joint filler compounds, laminated roofing, shingles, liquid roof coatings, plastic cements, and shingles; walls, siding, ceilings, e.g., acoustical blocks, papers, dampproofing coatings, compositions, insulating board, fabrics, felt, paper, joint filler compounds, masonry coatings, plaster boards, putty, asphalt, siding compositions, soundproofing, stucco base, and wallboard; hydraulics and erosion control applications, e.g., canal linings, sealants, catchment areas, basins, dam groutings, dam linings, protection, dike protection, ditch linings, drainage gutters, structures, embankment protection, groins, jetties, levee protection, mattresses for levee and bank protection, membrane linings, waterproofing, ore leaching pads, reservoir linings, revetments, sand dune stabilization, sewage lagoons, oxidation ponds, swimming pools, waste ponds, and water barriers.

Industrial applications, such as: aluminum oil compositions using asphalt backed felts, conduit insulation, lamination, insulating boards, paint compositions, felts, brake linings, clutch facings, heavy machinery, heavy machinery parts, industrial oils, including but not limited to hydraulic oils, compressor oils, turbine oils, bearing oils, gear oils, transformer (dielectric) oils, refrigeration oils, metalworking oils, and railroad oils, from heavy machinery, automobiles and automotive parts, motorcycles and motorcycle parts, motor oils, including but not limited to engine lubricating oil, vehicle crankcase oil, transmission fluids, and gearbox and differential oils, tar on heavy machinery, automobiles, motorcycles, and the like, floor sound deadeners, friction elements, insulating felts, panel boards, shim strips, tacking strips, underseal, electrical, armature carbons, windings, battery boxes, carbons, electrical insulating compounds, papers, tapes, wire coatings, junction box compounds, embalming, etching compositions, extenders, rubber, and other compositions;

explosives, fire extinguisher compounds, joint fillers, lap cement, lubricating grease, pipe coatings, dips, joint seals, plastic cements, plasticizers, preservatives, printing inks, well drilling fluid, wooden cask liners, impregnated, treated materials, armored bituminized fabrics, burlap impregnation, canvas treating, carpeting medium, deck cloth impregnation, fabrics, felts, mildew prevention, packing papers, pipes and pipe wrapping, planks, rugs, asphalt base, saw dust, cork, and asphalt compositions;

textiles, waterproofing, tiles, treated leather, wrapping papers, paints, varnishes, etc., acid-proof enamels, mastics, varnishes, acid-resistant coatings, air-drying paints, varnishes, anti-corrosive and anti-fouling paints, anti-oxidants and solvents, base for solvent compositions, baking and heat resistant enamels, boat deck sealing compound, lacquers, japans, marine enamels, belting, blasting fuses, briquette binders, burial vaults, casting molds, clay articles, clay pigeons, depilatory, expansion joints, flower pots, foundry cores, friction tape, gaskets, imitation leather, mirror backing, phonograph records, rubber, molded compounds, show fillers, soles, and table tops;

airport runways, taxiways, aprons, etc., asphalt blocks, brick fillers, bridge deck surfacing, crack fillers, curbs, gutters, drainage ditches, floors for buildings, warehouses, garages, etc., highways, roads, streets, shoulders, parking lots, driveways, pcc underseal, roof-deck parking, sidewalk, footpaths, soil stabilization, ballast-treatment, curve lubricant, dust laying, paved ballast, sub-ballast, paved crossings, freight yards, station platforms, rail fillers, railroad ties, tie impregnating, stabilization, paved surfaces for: dance pavilions, drive-in movies, gymnasiums, sports arenas, playgrounds, school yards, race tracks, running tracks, skating rinks, swimming and wading pools, tennis courts, handball courts, crude oil spills, wildlife cleanup, and tar sand separation.

IV. EXAMPLES

The following Examples have been included to illustrate representative embodiments of the presently disclosed subject matter. In light of the present disclosure and the general level of skill in the art, those of skill will appreciate that the following Examples are intended to be exemplary only and that numerous changes, modifications, and alterations can be employed without departing from the spirit and scope of the presently disclosed subject matter.

Example 1

General Procedure for the Preparation of a Silicone Oil (polydimethylsiloxane) Emulsion A predetermined aliquot of silicone oil (polydimethylsiloxane) is mixed with a predetermined aliquot of surfactant in a mixing tank. A predetermined amount of water is added to the mixture with continuous mixing of the components to provide a stable silicone oil (polydimethylsiloxane) emulsion of the desired concentration.

For example, in an exemplary embodiment, a five (5) gallon sample of the presently disclosed asphalt release agent was prepared by mixing 968.75 g of silicone oil with a viscosity of 50 centipoise with 968.75 g of a nonionic biodegradable surfactant, e.g., SYLGARD® 309 Silicone Surfactant (Dow Corning Corp., Midland, Mich., United States of America), in a mixing tank. Seventeen liters of water along with an additional 437 mL of water was added to the mixture with continuous mixing of the components to form a stable silicone oil (polydimethylsiloxane) emulsion comprising 5% by weight silicone oil, 5% by weight surfactant, and 90% by weight water.

By using the presently disclosed methods, a mixture of 5 g silicone oil (polydimethylsiloxane), 5 g SYLGARD® 309 Silicone Surfactant, and 90 g water formed a stable emulsion. Likewise, a mixture of 7.5 g silicone oil (polydimethylsiloxane), 7.5 g SYLGARD® 309 Silicone Surfactant, and 85 g water formed a stable emulsion. Further, a mixture of 10 g silicone oil (polydimethylsiloxane), 10 g SYLGARD® 309 Silicon Surfactant, and 80 g water formed a stable emulsion.

Example 2

General Procedure for Testing an Asphalt Release Agent

Provide a plate of aluminum, e.g., an 11.5"×10" (115 in$^2$; 741.934 cm$^2$) aluminum plate. Clean the plate with limonene followed by alcohol. Prepare the desired dilution of the asphalt release agent and fill it in a spray bottle. Place the aluminum plate on a balance and zero (tare) the weight. Place the aluminum plate in a vertical position and spray the asphalt release agent onto the aluminum plate in an up to down motion until complete coverage of the aluminum plate is observed. Wipe the excess asphalt release agent off of the aluminum plate and then reweigh the aluminum plate while coated with the asphalt release agent. Calculate the amount of asphalt release agent deposited onto the aluminum plate in gram per cm$^2$. Deposit hot asphalt heated to 320° F. onto the coated aluminum plate and allow the asphalt to cool to a temperature of 104° F. (40° C.). Slide the tray to determine if the asphalt will slide free, i.e., be released from, the aluminum plate.

In some embodiments, this test can be repeated without reapplying the asphalt release agent prior to depositing the hot asphalt onto the aluminum plate to determine the effectiveness of the asphalt release agent for multiple releases as demonstrated in Example 7 provided herein below.

Example 3

Preparation and Testing of Mixture A

One (1) gram of SYLGARD® 309 Silicone Surfactant, 5 grams of silicone oil and 94 grams of water were mixed as described in Example 1. This formulation results in an upper layer that mixes readily.

Ten (10) grams of Mixture A was evenly spread on an aluminum sheet measuring 18"×12". A hot asphalt mix at 320° F. was added and allowed to cool to 170° F. This asphalt slid freely off of the aluminum sheet without leaving a trace of binder or aggregate on the aluminum sheet.

Ten (10) grams of Mixture A was evenly spread on an aluminum sheet measuring 18"×12". A hot asphalt mix at 320° F. was added and allowed to cool to 180° F. This asphalt slid freely off of the aluminum sheet without leaving a trace of binder or aggregate on the aluminum sheet.

Ten (10) grams of Mixture A was evenly spread on an aluminum sheet measuring 10"×23". A hot asphalt mix at 320° F. was added and allowed to cool to room temperature. This asphalt slid off of the aluminum sheet without leaving a trace of binder or aggregate on the aluminum sheet.

Five (5) grams of Mixture A was evenly spread on an aluminum sheet measuring 18"×12". A hot asphalt mix at 320° F. was added and allowed to cool to 170° F. This asphalt slid freely off of the aluminum sheet without leaving a trace of binder or aggregate on the aluminum sheet.

Example 4

Preparation of Mixture B

Two (2) grams of SYLGARD® 309 Silicone Surfactant, five (5) grams of silicone oil, and 93 grams of water were mixed as described in Example 1. This formulation results in an upper layer that mixes readily.

Example 5

Preparation and Testing of Mixture C

An emulsion comprising 5% silicone oil and 1% Aerosol OT 100 was prepared as described in Example 1.

1.2 grams of Mixture C was evenly spread on an aluminum sheet. A hot asphalt mix at 320° F. was added and allowed to cool to room temperature. This asphalt slid off of the aluminum sheet without leaving a trace of binder or aggregate on the aluminum sheet.

1.7 grams of Mixture C was evenly spread on an aluminum sheet. A hot asphalt mix at 320° F. was added and allowed to cool to room temperature. This asphalt slid off of the aluminum sheet without leaving a trace of binder or aggregate on the aluminum sheet.

These results indicate that the emulsion can be diluted about fifty (50) times prior to application.

Example 6

Preparation and Testing of Mixture D

An emulsion comprising 5 wt % silicone oil, 5 wt % SYLGARD® 309 Silicone Surfactant, and 90 wt % water was prepared as described in Example 1. Three (3) grams of Mixture D was sprayed onto an aluminum sheet. A hot asphalt mix at 320° F. was added and allowed to cool to 104° F. This asphalt freely slid off of the aluminum sheet without leaving a trace of binder or aggregate on the aluminum sheet.

In additional experiments, 5 g of Mixture D was sprayed onto a 10"×23" stainless steel plate (230 in$^2$, 0.1483868 m$^2$). A hot asphalt mix at 320° F. (160° C.) was added to the stainless steel plate and allowed to cool to room temperature 70° F. (21° C.). This asphalt freely slid off of the stainless steel plate without leaving a trace of binder or aggregate on the stainless steel plate. These results indicate that the amount of silicone oil needed to cover the surface and render it non-stick to asphalt, even if the asphalt is allowed to cool to room temperature, is 0.3369 g/m$^2$ (0.0313 g/ft$^2$).

In additional measurements, Mixture D was diluted 10 times with water, and the diluted mixture was sprayed on the plate and weighed. The weight of the sprayed diluted mixture is 3.04 grams. The degree of coverage expressed in grams per square centimeter is $4.097 \times 10^{-6}$ g/cm$^2$, which accounts for the diluted emulsion. For the effective material (silicone oil and surfactant), the amount should be divided by 100 to yield the following value: $4.097 \times 10^{-8}$ g/cm$^2$.

In view of these experimental results, 7.338 g of the emulsion is required to cover one square meter of the surface or 0.626 g of the emulsion is required to cover one square foot of the metal surface and render it a nonstick surface. A regular dump truck with a truck bed dimension of 4 m (length)×2.5 m (width) equals 10 m$^2$ of the flat surface plus two long sides (2×1.6 m (high)×2.5 m (width) equals 8 m$^2$) would have a total surface area of 43.36 m$^2$ (466.7 ft$^2$) which would require coating. Thus, a dump truck bed having this surface area would require 318.20 mL (0.085 gallons) of the emulsion for a complete coating. Therefore, 0.1 gallon of Mixture D can be diluted ten times and sprayed onto the truck bed and box sides to render it nonstick.

Example 7

Demonstration of Multiple Releases

An emulsion comprising 5 wt % silicone oil, 5 wt % SYLGARD® Silicone Surfactant, and 90 wt % water was prepared as described in Example 5. Three (3) grams of Mixture D was sprayed onto an aluminum sheet. A hot asphalt mix at 320° F. was added and allowed to cool to 104° F. This asphalt slid off of the aluminum sheet without leaving a trace of binder or aggregate on the aluminum sheet as described in Example 6.

Without reapplying Mixture D to the aluminum sheet, a hot asphalt mix at 320° F. was added and allowed to cool to 104° F. This asphalt slid off of the aluminum sheet without leaving a trace of binder or aggregate on the aluminum sheet. This step was repeated and the asphalt slid off of the aluminum sheet without leaving a trace of binder or aggregate on the aluminum sheet. This step was repeated a fourth time. This time it took longer for the cooled asphalt to slide off of the plate, wherein it left a slight trace of binder on the aluminum sheet.

Example 8

Mixture of Silicone Oil and Biodiesel

A one (1) mL aliquot of 5 wt % silicone oil, 5 wt % SYLGARD® Silicone Surfactant, and 90 wt % biodiesel in 10 mL of water produced a stable emulsion, which was white in color.

Further, a 1 mL aliquot comprising 5 wt % Witconol® CO-550 (Crompton Corporation, Greenwich, Conn., United States of America), 5 wt % silicone oil, and 90 wt % biodiesel emulsifies well with 10 mL water and had low foam. High speed mixing of silicone oil and Witconol®) CO-360 with water, results in a stable emulsion.

Witconol® CO-550 and Witconol® CO-360 are ethoxylated castor oil surfactants.

These results indicate that a formulation comprising a biodiesel base can function as an asphalt release agent that can be diluted with water provided that an appropriate emulsifier is added.

Example 9

Physical Properties of Emulsions

An emulsion comprising 5 wt % silicone oil, 5 wt % surfactant, and 90 wt % water forms a stable emulsion. The flash points of such emulsions were found to be above laboratory limits, i.e., it does not flash.

Formulations comprising either 5 wt % surfactant or 2.5 wt % surfactant froze at −10° C. This observation suggests that an anti-freeze agent, e.g., ethylene glycol, can be added to decrease the freezing point. Accordingly, it was found that a formulation comprising 10 wt % ethylene glycol, 5 wt % silicone oil, 5 wt % SYLGARD® Silicone Surfactant, and 80 wt % water lowered the freezing point to −20° C.

It will be understood that various details of the presently described subject matter can be changed without departing from the scope of the presently described subject matter. Furthermore, the foregoing description is for the purpose of illustration only, and not for the purpose of limitation.

What is claimed is:

1. A composition consisting essentially of:
   5% by weight silicone oil component,
   5% by weight of alkoxylated polysiloxane surfactant, and
   90% by weight biodiesel.

2. The composition of claim 1, wherein the alkoxylated polysiloxane surfactant is (3-hydroxypropyl)-heptamethyltrisiloxane ethoxylated acetate.

3. The composition of claim 1, wherein the composition consisting of a 5% by weight silicone oil component, 5% by weight of alkoxylated polysiloxane surfactant, and 90% by weight biodiesel.

4. A method for suppressing a release of dust from a work site, the method comprising:
   (a) providing the composition of claim 1;
   (b) diluting the release composition in water to form a diluted release composition; and
   (c) applying the diluted release composition to a surface at a work site.

5. The method of claim 4, comprising diluting the release composition in water by one of:
   (a) adding water to a concentrate of the composition to form a diluted composition before it is applied to the surface at a work site; and
   (b) mixing water with the composition as it is applied to the surface at a work site.

6. The method of claim 4, wherein the work site is selected from the group consisting of a road construction site, coal crushing operation, a limestone crushing operation, and a concrete milling operation.

7. A method of applying an asphalt release composition to a measuring surface of an asphalt quality control instrument, the method comprising:
   (a) providing a composition of claim 1;
   (b) providing a measuring surface of an asphalt quality control instrument; and
   (c) applying the asphalt release composition to the measuring surface of the asphalt quality control instrument.

8. A composition consisting essentially of
   a volume of a dilutable composition consisting essentially of:
      5 weight % silicone oil component,
      5 weight % alkoxylated polysiloxane surfactant, and
      90 weight % biodiesel;
   a volume of water; and
   optionally a corrosion inhibitor, an anti-freeze agent, a biocide or a pH-adjusting chemical.

9. The composition of claim 8, wherein the composition consists essentially of one part by volume of the dilutable composition and 10 parts by volume water.

10. The composition of claim 9, wherein the surfactant is 3-(3-hydroxypropyl)-heptamethyltrisiloxane ethoxylated acetate.

11. The composition of claim 8, wherein the alkoxylated polysiloxane surfactant is 3-(3-hydroxypropyl)-heptamethyltrisiloxane ethoxylated acetate.

12. The composition of claim 8, wherein the composition further consist essentially of a corrosion inhibitor, an anti-freeze agent, a biocide or a pH-adjusting chemical.

13. The composition of claim 8, wherein the composition consists of a volume of the dilutable composition volume of water; and the dilutable composition consisting of 5 weight % silicone oil component, 5 weight % of alkoxylated polysiloxane surfactant, and 90 weight % biodiesel.

14. A method for releasing asphalt from a substrate, the method comprising:
   (a) applying the composition of claim 8, to a substrate to form a coated substrate;
   (b) contacting the coated substrate with hot asphalt; and
   (c) removing the asphalt from the substrate.

15. A method for promoting the release of an organic material from a substrate, the method comprising:
   (a) providing a substrate;
   (b) applying a release composition to the substrate before contacting the substrate with the organic material, wherein the release composition is a composition of claim 8; and
   (c) contacting the substrate with the organic material.

16. The method of claim 15, wherein the release composition further consisting essentially of a corrosion inhibitor.

17. The method of claim 16, wherein the corrosion inhibitor is selected from one of an amine and an imidazoline-based inhibitor.

18. The method of claim 16, wherein the corrosion inhibitor is present in an amount ranging from about 0 to about 500 ppm.

19. The method of claim 15, wherein the release composition further consisting essentially of an anti-freeze agent.

20. The method of claim 19, wherein the anti-freeze agent consisting essentially of an ethylene glycol.

21. The method of claim 19, wherein the anti-freeze agent is present in an amount ranging from about 0% by weight to about 10% by weight.

22. The method of claim 15, wherein the release composition further consisting essentially of a biocide.

23. The method of claim 22, wherein the biocide consisting essentially of a bactericide.

24. The method of claim 23, wherein the bactericide consisting essentially of sodium benzoate.

25. The method of claim 15, wherein the release composition further consisting essentially of a pH-adjusting chemical.

26. The method of claim 25, wherein the pH-adjusting chemical consisting essentially of a base.

27. The method of claim 26, wherein the base is selected from the group consisting of an alkali hydroxide, ammonia, sodium carbonate, sodium bicarbonate, and an amine.

28. The method of claim 15, wherein the release composition is non-toxic.

29. The method of claim 15, wherein the release composition is biodegradable.

30. The method of claim 15, wherein the release composition is non-corrosive.

31. The method of claim 15, wherein the release composition is non-flammable.

32. The method of claim 15, wherein the release composition is essentially free of volatile organic solvents.

33. The method of claim 15, wherein the organic material comprises a bituminous material.

34. The method of claim 33, wherein the bituminous material is selected from the group consisting of a bituminous binder, an asphalt, a resin, a coal tar pitch, a tar, and an automotive undercoating material.

35. The method of claim 34, wherein the bituminous material comprises an asphalt.

36. The method of claim 35, wherein the asphalt comprises a polymer-modified asphalt.

37. The method of claim 15, wherein the organic material comprises an adhesive material.

38. The method of claim 37, wherein the adhesive material comprises a paint.

39. The method of claim 38, wherein the paint comprises an automotive paint.

40. The method of claim 37, wherein the adhesive material comprises masking tape.

41. The method of claim 15, wherein the organic material is selected from one of a rubber material and a plastic material.

42. The method of claim 15, wherein the substrate comprises a metal substrate.

43. The method of claim 42, wherein the metal substrate is on an article used for transporting a bituminous material.

44. The method of claim 43, wherein the article used for transporting the bituminous material comprises a truck bed.

45. The method of claim 44, wherein the truck bed comprises a dump truck bed.

46. The method of claim 42, wherein the metal substrate is on an article used for applying a bituminous material to a second substrate.

47. The method of claim 46, wherein the second substrate is selected from one of an existing pavement and a road base.

48. The method of claim 46, wherein the article used for applying the bituminous material comprises a piece of paving equipment.

49. The method of claim 48, wherein the piece of paving equipment comprises an asphalt spreader.

50. The method of claim 48, wherein the piece of paving equipment comprises a pressure roller.

51. The method of claim 46, wherein the second substrate comprises a building material.

52. The method of claim 51, wherein the building material comprises a roofing material.

53. The method of claim 42, wherein the metal substrate is on an article used for handling a bituminous material.

54. The method of claim 53, wherein the article used for handling the bituminous material comprises a workpiece.

55. The method of claim 54, wherein the workpiece comprises a shovel.

56. The method of claim 54, wherein the workpiece comprises a rake.

57. The method of claim 42, wherein the metal substrate is selected from the group consisting of a mold, a die, and a cutting blade.

58. The method of claim 42, wherein the metal substrate is selected from the group consisting of a storage drum, a storage tank, a transport trailer, piping, a roller, and an undercarriage of a vehicle.

59. The method of claim 15, wherein the substrate comprises a non-metal substrate.

60. The method of claim 59, wherein the non-metal substrate is selected from the group consisting of a plastic substrate, a rubber substrate, a ceramic substrate, and combinations thereof.

61. The method of claim 59, wherein the non-metal substrate comprises a conducting material.

62. The method of claim 59, wherein the non-metal substrate comprises a non-conducting material.

63. The method of claim 59, wherein the non-metal substrate comprises a component of an asphalt quality control instrument.

64. The method of claim 63, wherein the asphalt quality control instrument comprises a gauge.

65. The method of claim 63, wherein the component of an asphalt quality control instrument comprises a measuring surface of a gauge.

66. The method of claim 65, wherein the measuring surface of the gauge comprises a probe.

67. The method of claim 59, wherein the non-metal substrate is selected from the group consisting of a tire, a roller, and a conveyer belt.

68. The method of claim 15, wherein the applying of the release composition to a substrate comprises:
(a) delivering the release composition to a spray nozzle;
(b) flowing the release composition through a spray nozzle; and
(c) spraying the release composition onto the substrate.

69. The method of claim 15, wherein the applying of the release composition to the substrate comprises a coating process.

70. The method of claim 15, wherein the contacting the substrate with the bituminous material of step (c) is performed more than one time, without repeating step (b) of applying the release composition to the substrate.

71. The method of claim 15, wherein the contacting the substrate with the bituminous material is performed two times without repeating step (b) of applying the release composition to the substrate.

72. The method of claim 15, wherein the contacting the substrate with the bituminous material is performed three or more times without repeating step (b) of applying the release composition to the substrate.

73. A composition consisting essentially of:
5% by weight silicone oil component,
5% by weight of ethoxylated castor oil surfactant, and
90% by weight biodiesel.

74. A composition consisting of a 5% by weight silicone oil component, 5% by weight of ethoxylated castor oil surfactant, and 90% by weight biodiesel.

75. A composition consisting essentially of
a volume of a dilutable composition consisting essentially of:
5 weight % silicone oil component,
5 weight % ethoxylated castor oil surfactant, and
90 weight % biodiesel;
a volume of water;
optionally a corrosion inhibitor, an anti-freeze agent, a biocide or a pH-adjusting chemical.

76. The composition of claim 75, wherein the composition consists essentially of one part by volume of the dilutable composition and 10 parts by volume water.

77. The composition of claim 75, wherein the composition further consist essentially of a corrosion inhibitor, an anti-freeze agent, a biocide or a pH-adjusting chemical.

78. The composition of claim 75, wherein the composition consists of a volume of the dilutable composition and a volume of water; and the dilutable composition consisting of 5 weight % silicone oil component, 5 weight % of ethoxylated castor oil surfactant, and 90 weight % biodiesel.

79. A method for promoting the release of an organic material from a substrate, the method comprising:
(a) providing a substrate;
(b) applying a release composition to the substrate before contacting the substrate with the organic material, wherein the release composition is a composition of claim 75; and
(c) contacting the substrate with the organic material.

80. The method of claim 79, wherein the organic material comprises asphalt.

* * * * *